United States Patent
Nelson et al.

(10) Patent No.: US 9,617,461 B2
(45) Date of Patent: Apr. 11, 2017

(54) COMPOSITIONS AND METHODS FOR WELL COMPLETIONS

(75) Inventors: Erik Nelson, Houston, TX (US); Tatiana Pyatina, Bures-sur-Yvette (FR); Sylwia Komocki, Chatenay Malabry (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 314 days.

(21) Appl. No.: 12/960,897

(22) Filed: Dec. 6, 2010

(65) Prior Publication Data
US 2012/0142812 A1  Jun. 7, 2012

(51) Int. Cl.
| | | |
|---|---|---|
| C04B 14/00 | (2006.01) | |
| C04B 16/00 | (2006.01) | |
| C04B 24/00 | (2006.01) | |
| C09K 8/00 | (2006.01) | |
| C09K 8/487 | (2006.01) | |
| C04B 28/04 | (2006.01) | |
| C09K 8/467 | (2006.01) | |

(52) U.S. Cl.
CPC .............. *C09K 8/487* (2013.01); *C04B 28/04* (2013.01); *C09K 8/467* (2013.01)

(58) Field of Classification Search
CPC .......... C04B 28/04; C09K 8/487; C09K 8/467
USPC .................. 523/130; 106/727, 717, 725, 728
See application file for complete search history.

(56) References Cited

U.S. PATENT DOCUMENTS

| | | | |
|---|---|---|---|
| 5,672,203 A * | 9/1997 | Chatterji et al. ............... | 106/808 |
| 5,728,210 A * | 3/1998 | Moran et al. .................. | 106/823 |
| 6,180,571 B1 | 1/2001 | Sifferman et al. | |
| 6,277,900 B1 | 8/2001 | Oswald et al. | |
| 6,492,305 B2 | 12/2002 | Sifferman et al. | |
| 6,978,835 B1 | 12/2005 | Reddy et al. | |
| 7,335,794 B2 | 2/2008 | Chang et al. | |
| 7,451,817 B2 * | 11/2008 | Reddy et al. ................. | 166/292 |
| 7,497,263 B2 | 3/2009 | Parris et al. | |
| 7,531,483 B2 | 5/2009 | Pena et al. | |
| 7,569,522 B2 | 8/2009 | Pena et al. | |
| 2005/0077045 A1 * | 4/2005 | Chatterj et al. ............... | 166/293 |
| 2007/0235192 A1 * | 10/2007 | Michaux et al. .............. | 166/293 |
| 2009/0145607 A1 | 6/2009 | Li | |

(Continued)

FOREIGN PATENT DOCUMENTS

EP 1886980 2/2010

OTHER PUBLICATIONS

Nelson EB, Michaux M and Drochon B: "Cement Additives and Mechanisms of Action," in Nelson EB and Guillot D. (eds.): Well Cementing (2nd Edition), Schlumberger, Houston (2006) 49-91.

*Primary Examiner* — David Karst
(74) *Attorney, Agent, or Firm* — Andrea E. Tran

(57) ABSTRACT

Well-cementing compositions for use in high-pressure, high-temperature (HPHT) wells usually contain a complex array of cement additives, including retarders, dispersants and fluid-loss additives. Under these extreme conditions additive degradation, reactions between additives, reactions between additives and the cement, or combinations thereof may occur—causing slurry gelation, premature setting or both. Incorporation of organoamine compounds in the cement compositions may help prevent or reduce the severity of slurry gelation, setting-time reduction or both.

8 Claims, 2 Drawing Sheets

(56) References Cited

U.S. PATENT DOCUMENTS

2010/0229715 A1* 9/2010 Tonyan .................. F41H 5/0428
89/36.02

* cited by examiner

COMPOSITIONS AND METHODS FOR WELL COMPLETIONS

BACKGROUND OF THE INVENTION

The statements in this section merely provide background information related to the present disclosure and may not constitute prior art.

Embodiments relate to compositions and methods for treating subterranean formations, in particular, compositions and methods for cementing subterranean wells.

During the construction of subterranean wells, it is common, during and after drilling, to place a tubular body in the wellbore. The tubular body may comprise drillpipe, casing, liner, coiled tubing or combinations thereof. The purpose of the tubular body is to act as a conduit through which desirable fluids from the well may travel and be collected. The tubular body is normally secured in the well by a cement sheath. The cement sheath provides mechanical support and hydraulic isolation between the zones or layers that the well penetrates. The latter function is important because it prevents hydraulic communication between zones that may result in contamination. For example, the cement sheath blocks fluids from oil or gas zones from entering the water table and polluting drinking water. In addition, to optimize a well's production efficiency, it may be desirable to isolate, for example, a gas-producing zone from an oil-producing zone. The cement sheath achieves hydraulic isolation because of its low permeability. In addition, intimate bonding between the cement sheath and both the tubular body and borehole is necessary to prevent leaks.

Optimal cement-sheath placement often requires that the cement slurry contain a retarder, a dispersant and a fluid-loss additive. Cement retarders delay the setting of the cement slurry for a period sufficient to allow slurry mixing and slurry placement in the annular region between the casing and the borehole wall, or between the casing and another casing string. Dispersants help maintain the proper rheological properties of the cement slurry, promoting optimal fluid displacement—especially in long, narrow annuli. Fluid-loss additives help prevent the fluid phase of the cement slurry from escaping into the formation, leaving the solids behind.

A wide range of chemical compounds may be employed as cement retarders. The most common classes include lignosulfonates, cellulose derivatives, hydroxycarboxylic acids, saccharide compounds, organophosphonates and certain inorganic compounds such as sodium chloride (in high concentrations) and zinc oxide. A more complete discussion of retarders for well cements may be found in the following publication—Nelson E B, Michaux M and Drochon B: "Cement Additives and Mechanisms of Action," in Nelson E B and Guillot D. (eds.): *Well Cementing* ($2^{nd}$ *Edition*), Schlumberger, Houston (2006) 49-91.

Certain types of retarders may be blended with other compounds to extend their useful temperature range, improve cement-slurry properties, or both. For example, the useful temperature range of certain lignosulfonate retarders may be extended to more than 260° C. by adding sodium tetraborate decahydrate (borax). Sodium gluconate may be blended with a lignosulfonate and tartaric acid to improve the rheological properties of the cement slurry. The useful temperature range of organophosphonate retarders may also be extended to more than 260° C. by adding borate compounds. For well cementing, the most common dispersants are generally sulfonated aromatic polymers such as polynaphthalene sulfonate, polymelamine sulfonate and polystyrene sulfonate. Fluid-loss additives for well cements include water-soluble polymers such as polysaccharides (e.g., hydroxyethylcellulose), polyamines, polyvinylalcohols, and polyacrylates. Particulates such as bentonite, crosslinked polyvinylalcohols and latexes are also common. Thus, a myriad of retarders, retarder blends, dispersants and fluid-loss additives exist which may be applicable to a wide range of subterranean-well conditions.

When cementing high-pressure, high-temperature (HPHT) wells, the cement-slurry design may be complex, involving several additives that must be mutually compatible in order to achieve a successful cement job. In general, the well-cementing industry considers HPHT wells to begin at 150° C. (300° F.) bottomhole temperature and 69 MPa (10,000 psi) bottomhole pressure. The additives must remain stable at temperatures that may exceed 260° C. for a period sufficient to at least allow proper cement-slurry placement. Additive decomposition during placement may have undesirable consequences, including slurry gelation (strong viscosity increase) and premature setting. Similarly, reactions between additives may also cause rheological difficulties.

Under HPHT conditions, undesirable interactions between the additives and the cement become more likely. Such interactions may, in some cases, result in shorter thickening times, compromised performance of some additives (e.g. fluid-loss-control agents) and gelation problems (often referred to as a "quaternary gel"). The severity of such problems is strongly cement dependent.

Despite the valuable contributions of the prior art, there remains a need for means preventing gelation, premature setting, or both in Portland-cement slurries at temperatures up to and exceeding 260° C.

SUMMARY

Some embodiments allow such improvements by providing cement additives that stabilize the rheological properties of Portland-cement slurries exposed to a HPHT environment.

In an aspect, embodiments relate to well-cementing compositions.

In a further aspect, embodiments relate to methods for controlling the rheological properties, the setting time, or both of a cement slurry.

In yet a further aspect, embodiment relate to methods for cementing a subterranean well.

DETAILED DESCRIPTION

Figure 1:
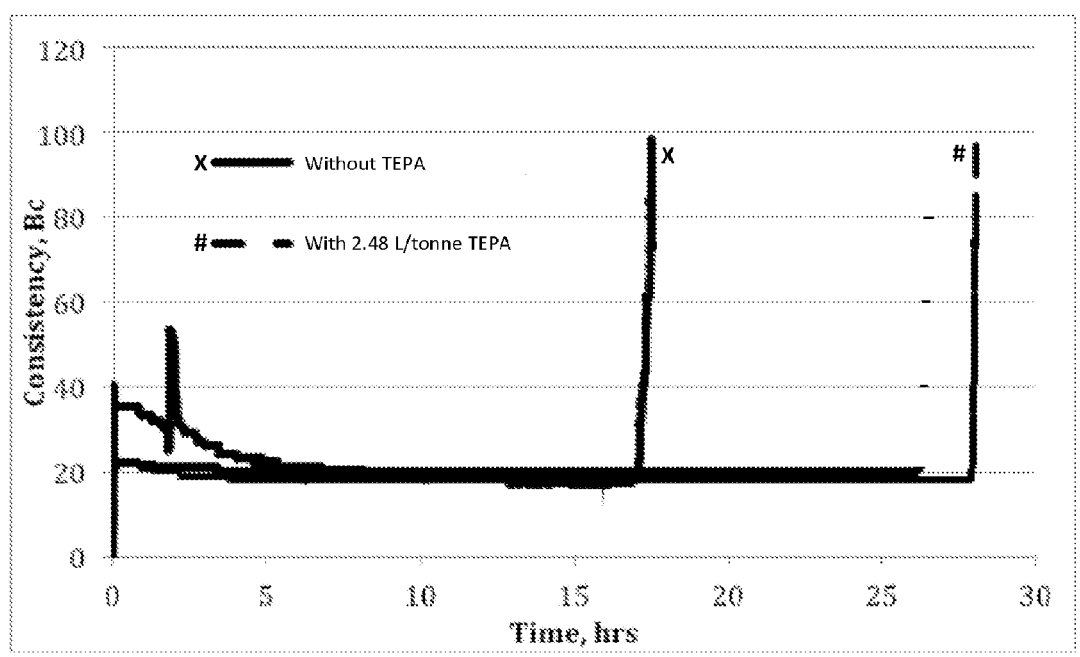
FIG. 1 shows two thickening-time traces that illustrate the effect of TEPA on cement-slurry behavior at 260° C. and 140 MPa pressure.

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range. All ratios or percentages described here after are by weight unless otherwise stated.

As stated earlier, there is a need for means by which cement-slurry gelation, premature setting, or both, may be prevented when cementing HPHT wells. The inventors have surprisingly discovered that organoamine compounds are useful for stabilizing the rheological properties of Portland-cement slurries, preventing premature setting, or both. Furthermore, adequate fluid-loss control is preserved.

In an aspect, embodiments relate to well-cementing compositions that comprise water, Portland cement, one or more organoamine compounds, one or more retarder compounds, one or more borate compounds and at least one fluid-loss additive. The composition may also be pumpable. Those skilled in the art will recognize that a pumpable cement slurry usually has a viscosity lower than 1000 mPa-s at a shear rate of 100 s$^{-1}$.

In a further aspect, embodiments relate to methods for controlling the rheological properties, setting time or both of a cement slurry. A cement slurry is provided that comprises water and Portland cement. Incorporated into the slurry are one or more organoamine compounds, one or more retarder compounds, one or more borate compounds and at least one fluid-loss additive.

In yet a further aspect, embodiments relate to methods for cementing subterranean wells. A cement slurry is provided that comprises water and Portland cement. Incorporated into the slurry are one or more organoamine compounds, one or more retarder compounds, one or more borate compounds and at least one fluid-loss additive. The slurry comprising the organoamine, retarder and borate compounds, and at least one fluid-loss additive, is placed in the well. Those skilled in the art will recognize that the methods may pertain to both primary and remedial cementing operations.

For all embodiments, the organoamine compounds may be chosen from the list comprising: monoethanolamine, diethanolamine, triethanolamine, monoisopropanolamine, diisopropanolamine, triisopropanolamine, monoethylenediamine, diethylenetriamine, triethylenetetramine, pentaethylenehexamine and tetraethylenepentamine, or mixtures thereof. Of these, the ethyleneamine compounds are preferred. Tetraethylenepentamine (TEPA) is most preferred. The organoamine-compound concentration is preferably between about 0.2 L/tonne of cement slurry and about 5.0 L/tonne of cement slurry. A more preferred concentration range lies between about 0.5 L/tonne of cement slurry and about 4.0 L/tonne of cement slurry.

For all embodiments, the retarder compounds may comprise a copolymer of styrene sulfonate and maleic acid, one or more organophosphonate compounds, or a combination thereof. The organophosphonate compounds may be chosen from the list comprising amino trimethylene phosphonic acid; 1-hydroxyethylidene-1,1,-disphosphonic acid; ethylene diamine tetramethylene phosphonic acid, hexamethylenediamine methylene phosphonic acid, diethylene triamine pentamethylene phosphonic acid; polyamino phosphonic acid, 2-phosphono-butane-tricarboxylic acid-1,2,4; bis(hexamethylene triamine pentamethylene phosphonic acid) and salts thereof, or mixtures thereof. Of these, the pentasodium salt of ethylene diamine tetramethylene phosphonic acid (EDTMP) is preferred. The retarder concentration is preferably between about 0.1% and about 1.5% by weight of solids in the slurry. This concentration scheme is commonly called "by weight of blend," and will hereinafter appear as the abbreviation "BWOB." The organophosphonate concentration in the slurry is preferably between about 0.02% and 0.4% BWOB. The concentration of the copolymer of styrene sulfonate and maleic acid is preferably between about 0.5% and about 1.5% BWOB.

For all embodiments, the borate compounds may comprise boric acid, sodium metaborate, potassium metaborate, sodium diborate, potassium diborate, sodium triborate, potassium triborate, sodium tetraborate, potassium tetraborate, sodium pentaborate, and potassium pentaborate, or mixtures thereof. These compounds may be anhydrous or contain waters of hydration. Of these, sodium tetraborate, potassium tetraborate, sodium pentaborate and potassium pentaborate are preferred. Sodium pentaborate is most preferred. The concentration of the borate compound is preferably between about 0.5% and 2.5% BWOB.

For all embodiments, the fluid-loss additive preferably comprises a copolymer of 2-Acrylamido-2-methylpropane sulfonic acid (AMPS) and acrylamide, a copolymer of AMPS and acrylic acid, or both. The concentration of the fluid-loss additive is preferably between about 0.2% and about 1.0% BWOB or, if in liquid form, between about 16.7 L/tonne and about 83.5 L/tonne of cement slurry. A suitable fluid-loss additive is the copolymer as disclosed in U.S. Pat. No. 6,277,900.

For all embodiments, the cement compositions may further comprise more additives such as (but not limited to) extenders, lost-circulation additives, additives for improving set-cement flexibility, chemical-expansion agents, self-healing additives, antifoam agents, gas generating additives and anti-settling agents.

EXAMPLES

The following examples serve to further illustrate some embodiments.

For all examples, cement-slurry preparation, thickening-time measurements and fluid-loss measurements were performed according to procedures published in ISO Publication 10426-2. Fluid-loss measurements were performed with a stirred fluid-loss cell.

Cement slurries were prepared with a blend that contained 33% by volume of blend (BVOB) Portland cement (Dyckerhoff Black Label Class G or Texas Lehigh Class H cement), 10% BVOB fine silica (CEMPLUS GEO Microfine Silica, available from Imextco, Singapore), 7% BVOB medium-size hematite (PMR300, available from Plomp Mineral Services, The Netherlands), 9% BVOB manganese tetraoxide (Micromax FF, available from Elkem Chemicals, Inc.), and 41% BVOB coarse silica (LG50, available from Plomp Mineral Services).

Compared to the other materials in the blend, the cement has a medium particle size. Therefore, the blend contained approximately 41% BVOB coarse particles, 40% BVOB medium-size particles and 19% BVOB fine particles.

To minimize foaming during cement-slurry mixing, 4.2 L/tonne of silicone antifoam agent were added to all slurries. In some cases, bentonite was added to help prevent solids sedimentation or the development of free fluid in the slurries when exposed to high temperatures.

A fluid-loss-control additive was incorporated into all slurries—a high-molecular-weight copolymer of AMPS and acrylamide (UNIFLAC™ Liquid, available from Schlumberger). The retarder formulation contained two materials: (1) an aqueous solution containing sodium pentaborate and pentasodium EDTMP (weight ratio: 6.7); (2) a copolymer of styrene sulfonate and maleic acid (molar ratio=1) (Narlex D-72, available from ALCO Chemical).

The cement slurries were prepared at a solid-volume-fraction of 0.59 to 0.61, depending upon the additive concentrations. The slurry densities varied slightly, but were always close to 2277 kg/m$^3$ (19 lbm/gal). Liquid additives were added to the mix fluid (tap water), and solid additives were dry blended with the cement.

Thickening times were measured with a pressurized consistometer rotating at 150 RPM. The initial hydrostatic pressure in the consistometer was 13.8 MPa (2000 psi), and the final hydrostatic pressures varied between 140 MPa (20,300 psi) and 203 MPa (29,500 psi). Experiments were conducted at three final temperatures: 260° C. (500° F.), 274° C. (525° F.) and 302° C. (575° F.), and the heat-up times to reach the final temperatures were 90 min, 105 min and 130 min, respectively. The thickening time corresponds to the time necessary to reach 100 Bearden units (Bc).

Example 1

Nine cement slurries were prepared, the compositions of which are presented in Table 1. The slurries were designed with two different batches of Class H (Designs 1-6) cement and one batch of Class G cement (Designs 7-9).

Thickening times were measured at 260° F. (500° F.). Designs that contained TEPA had significantly longer thickening times.

TABLE 1

Effect of TEPA on Cement-Slurry Thickening Times

| | Design # | | | | | | | | |
|---|---|---|---|---|---|---|---|---|---|
| | 1 | 2 | 3 | 4 | 5 | 6 | 7 | 8 | 9 |
| | Cement | | | | | | | | |
| | Class H Batch 1 | | | Class H Batch 2 | | | Class G | | |
| Bentonite (% BWOB) | — | — | 0.8 | 0.8 | 0.8 | 0.8 | 0.8 | 0.8 | 0.8 |
| Retarder (L/tonne) | 49.2 | 49.2 | 49.2 | 49.2 | 49.2 | 49.2 | 49.2 | 49.2 | 49.2 |
| Dispersant (% BWOB) | 0.5 | 0.5 | 1 | 1 | 1 | 1 | 1 | 1 | 1 |
| Fluid-Loss Add. (L/tonne) | 33.4 | 33.4 | 33.4 | 33.4 | 25.1 | 25.1 | 25.1 | 25.1 | 25.1 |
| TEPA Additive* (L/tonne) | — | 3.3 | — | 3.3 | — | 3.3 | — | 0.8 | 1.65 |
| Thickening time (hr:min) | 9:17 | 10:12 | 10:37 | 22:45 | 13:03 | 26:32 | 9:53 | 14:46 | 20:58 |
| Pressure, MPa (psi) | 140 (20,300) | | | | | 203 (29,500) | | | |

*95 wt % TEPA, 6 wt % pentaethylenehexamine, 2 wt % triethylenetetramine

Example 2

The following series of experiments involved 11 slurry designs. Thickening-time tests were performed at 260° C., 274° C. and 302° C. All tests were performed at 203 MPa pressure. The results show that adding TEPA to the cement formulations may prevent the occurrence of gelation, known as a quaternary gel. Such gels may adversely affect the operator's ability to achieve proper cement placement.

Figure 2:
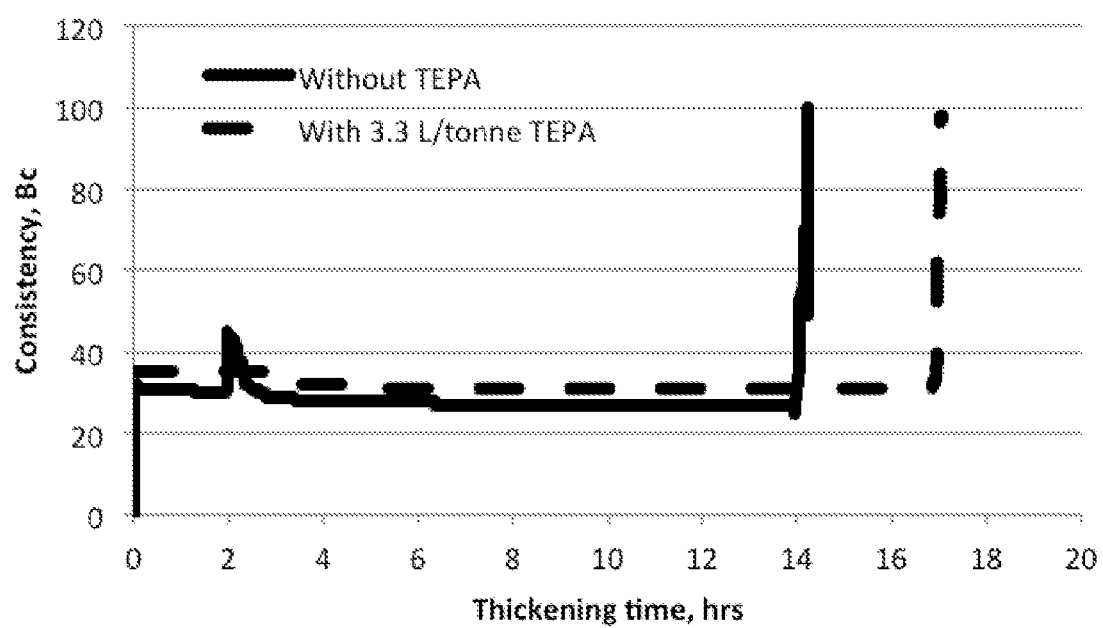
FIG. 2 shows two thickening-time traces that illustrate the effect of TEPA on the cement-slurry behavior at 260° C. and 203 MPa pressure.

The quaternary gels were detected during the thickening-time tests, and appeared as peaks on the thickening-time curve. Therefore, the magnitude of the gels is expressed in Bearden units (Bc). At the three temperatures, addition of TEPA prevented the occurrence of quaternary gels. Thickening-time curves for Designs 11 and 12 are shown in FIG. 1. Thickening-time curves for Designs 13 and 14 are shown in FIG. 2.

TABLE 2

Effect of TEPA on Cement-Slurry Thickening Times and the Formation of Quaternary Gels.

| | Design # | | | | | | | | | | |
|---|---|---|---|---|---|---|---|---|---|---|---|
| | 10 | 11 | 12 | 13 | 14 | 15 | 16 | 17 | 18 | 19 | 20 |
| | Temperature, ° C. | | | | | | | | | | |
| | 260 | | | | | | | 274 | | 302 | |
| Bentonite (% bwob) | 1.0 | 1.0 | 1.0 | — | — | 0.8 | 0.8 | 0.8 | 0.8 | 1.0 | 1.0 |
| Retarder (L/tonne) | 49.2 | 49.2 | 49.2 | 49.2 | 49.2 | 49.2 | 49.2 | 49.2 | 49.2 | 125 | 125 |
| Dispersant (% bwob) | 1.0 | 1.0 | 1.0 | 0.5 | 0.5 | 1 | 1 | 0.5 | 0.5 | 0.75 | 0.75 |
| Fluid-Loss Add. (L/tonne) | — | 33.4 | 33.4 | 33.4 | 33.4 | 33.4 | 33.4 | 33.4 | 33.4 | 33.4 | 33.4 |

TABLE 2-continued

Effect of TEPA on Cement-Slurry Thickening Times and the Formation of Quaternary Gels.

| | Design # | | | | | | | | | | |
|---|---|---|---|---|---|---|---|---|---|---|---|
| | 10 | 11 | 12 | 13 | 14 | 15 | 16 | 17 | 18 | 19 | 20 |
| | Temperature, ° C. | | | | | | | | | | |
| | | | | 260 | | | | 274 | | 302 | |
| TEPA Additive (L/tonne) | — | — | -2.5 | — | 3.3 | — | 3.3 | — | 3.3 | — | 3.3 |
| Thickening time (hr:min) | 28:03 | 17:28 | 26:30 | 14:14 | 17:02 | 10:37 | 22:45 | 10:00 | 10:30 | 1:32 | 4:46 |
| Quaternary gel (Bc) | None | 53 | None | 44 | None | 36 | None | 44 | None | 100 | None |
| Cement | Class G | | | Class H, batch 1 | | Class H, batch 2 | | | Class H, batch 1 | | |

Example 3

The fluid-loss behavior of seven slurry designs was tested. The results, shown in Table 3, show that adding TEPA did not have a detrimental effect on fluid-loss control.

TABLE 3

Effect of TEPA on Cement-Slurry Fluid-Loss Control.

| | Design # | | | | | | |
|---|---|---|---|---|---|---|---|
| | 21 | 22 | 23 | 24 | 25 | 26 | 27 |
| | Test temperature (° C.) | | | | | | |
| | 260 | | | 274 | | 302 | |
| Bentonite (% bwob) | — | — | 0.8 | 0.8 | 0.8 | 0.8 | 0.8 |
| Retarder (L/tonne) | 49.2 | 49.2 | 49.2 | 49.2 | 49.2 | 49.2 | 49.2 |
| Dispersant (% bwob) | 0.5 | 0.5 | 1 | 1 | 1 | 1 | 1 |
| Fluid-Loss Add. (L/tonne) | 33.4 | 33.4 | 25.1 | 25.1 | 33.4 | 33.4 | 25.1 |
| TEPA Additive (L/tonne) | — | 3.3 | — | 3.3 | 3.3 | 2.1 | 2.1 |
| API Fluid Loss (mL/30 min) | 74 | 68 | 35 | 26 | 11 | 20 | 27 |
| Cement | Class H, batch 1 | | | Class G | | Class H, batch 1 | |

The invention claimed is:

1. A method for controlling the rheological properties, the setting time, or both of a cement slurry, comprising:
   (i) providing a cement slurry comprising water and Portland cement; and
   (ii) incorporating one or more organoamine compounds, one or more retarders, one or more borate compounds and at least one fluid-loss additive in the slurry simultaneously during slurry mixing,
   wherein the one or more organoamine compounds is present at a concentration between 0.2 L/tonne and 5.0 L/tonne of cement slurry, and the one or more organoamine compounds prevents formation of a quaternary gel in the cement slurry,
   wherein the organoamine compounds are one or more members selected from the group consisting of monoethanolamine, diethanolamine, monoisopropanolamine, diisopropanolamine, monoethylenediamine, diethylenetriamine, triethylenetetramine, pentaethylenehexamine, and tetraethylenepentamine,
   wherein the cement slurry has a temperature between 260° C. and 302° C.

2. The method of claim 1, wherein the one or more retarders comprises a copolymer of styrene sulfonate and maleic acid, one or more organophosphonate compounds, or both; wherein the organophosphonate compounds comprise one or more members of the group consisting of amino trimethylene phosphonic acid; 1-hydroxyethylidene-1,1,-disphosphonic acid; ethylene diamine tetramethylene phosphonic acid, hexamethylenediamine methylene phosphonic acid, diethylene triamine pentamethylene phosphonic acid; polyamino phosphonic acid, 2-phosphono-butane-tricarboxylic acid-1,2,4; bis(hexamethylene triamine pentamethylene phosphonic acid) and salts thereof.

3. The method of claim 1, wherein the at least one fluid-loss additive comprises a copolymer of 2-acrylamido-2-methylpropane sulfonic acid and acrylamide, or a copolymer of 2-acrylamido-2-methylpropane sulfonic acid and acrylic acid, or both.

4. The method of claim 1, wherein the borate compounds comprise boric acid, sodium metaborate, potassium metaborate, sodium diborate, potassium diborate, sodium triborate, potassium triborate, sodium tetraborate, potassium tetraborate, sodium pentaborate, or potassium pentaborate, or mixtures thereof.

5. A method for cementing a subterranean well, comprising:
   (i) providing a cement slurry comprising water and Portland cement;
   (ii) incorporating one or more organoamine compounds, one or more retarders, one or more borate compounds and at least one fluid-loss additive in the slurry simultaneously during slurry mixing; and
   (iii) placing the slurry in the well,
   wherein the one or more organoamine compounds is present at a concentration between 0.2 L/tonne and 5.0 L/tonne of cement slurry, and the one or more organoamine compounds prevents formation of a quaternary gel in the cement slurry
   wherein the organoamine compounds are one or more members selected from the group consisting of monoethanolamine, diethanolamine, monoisopropanolamine, diisopropanolamine, monoethylenediamine, diethylenetriamine, triethylenetetramine, pentaethylenehexamine, and tetraethylenepentamine, wherein the cement slurry attains a temperature between 260° C. and 302° C. during placement in the well.

6. The method of claim 5, wherein the one or more retarders comprises a copolymer of styrene sulfonate and maleic acid, one or more organophosphonate compounds, or both; wherein the organophosphonate compounds comprise one or more members selected from the group consisting of amino trimethylene phosphonic acid; 1-hydroxyethylidene-1,1,-disphosphonic acid; ethylene diamine tetramethylene phosphonic acid, hexamethylenediamine methylene phosphonic acid, diethylene triamine pentamethylene phosphonic acid; polyamino phosphonic acid, 2-phosphono-butane-tricarboxylic acid-1,2,4; bis(hexamethylene triamine pentamethylene phosphonic acid) and salts thereof.

7. The method of claim 5, wherein the at least one fluid-loss additive comprises a copolymer of 2-acrylamido-2-methylpropane sulfonic acid and acrylamide, or a copolymer of 2-acrylamido-2-methylpropane sulfonic acid and acrylic acid, or both.

8. The method of claim 5, wherein the borate compounds comprise boric acid, sodium metaborate, potassium metaborate, sodium diborate, potassium diborate, sodium triborate, potassium triborate, sodium tetraborate, potassium tetraborate, sodium pentaborate, or potassium pentaborate, or mixtures thereof.

* * * * *